Patented Jan. 5, 1932

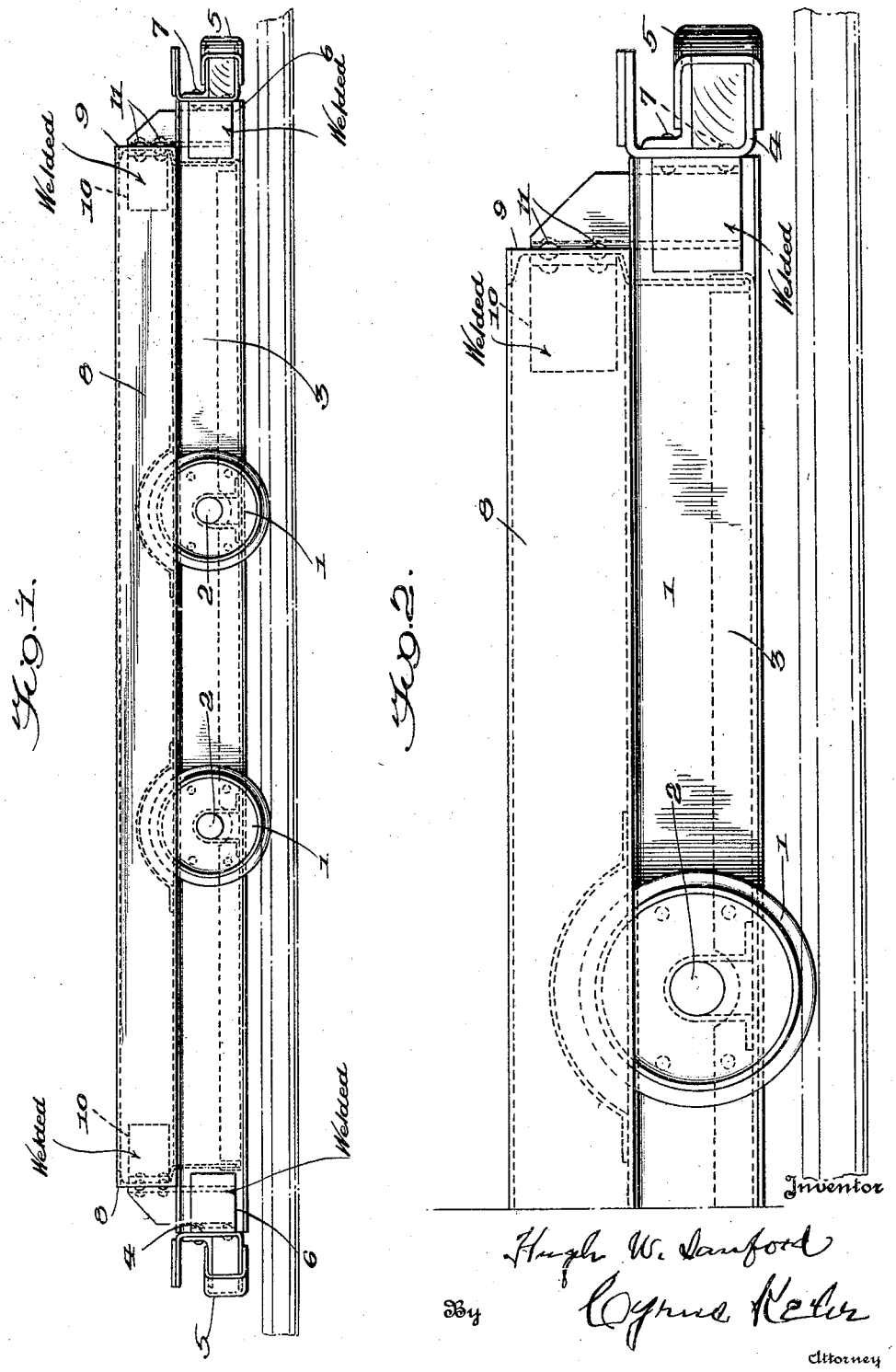

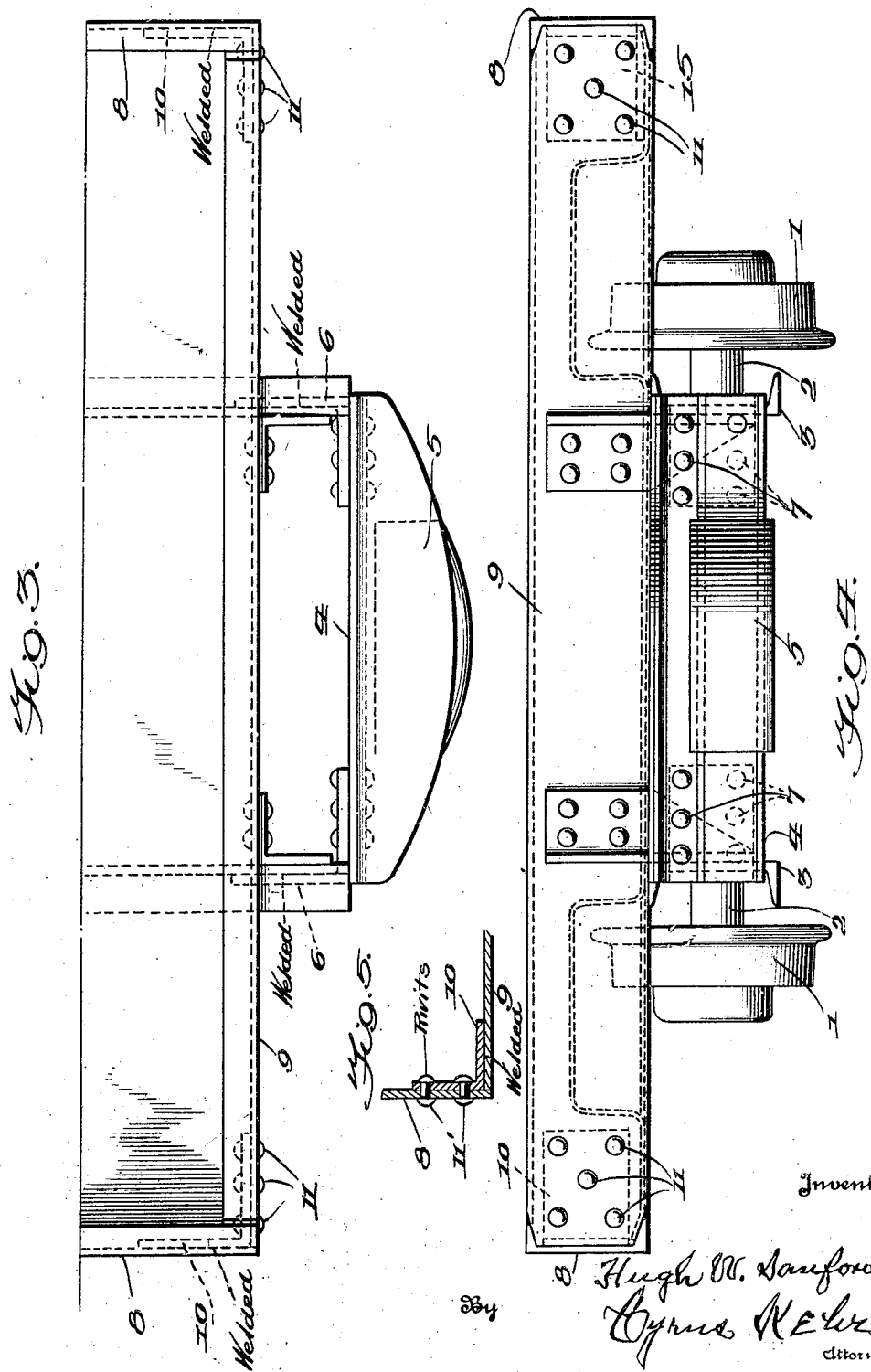

1,839,267

UNITED STATES PATENT OFFICE

HUGH W. SANFORD, OF KNOXVILLE, TENNESSEE

RAILWAY CAR CONSTRUCTION

Application filed February 3, 1931. Serial No. 513,195.

This invention relates to an improvement in railway car construction, and more particularly to the construction of mine cars.

It has been proposed heretofore to electrically weld the main parts of a mine car together to reduce the shop cost of constructing such a car. This welding of the parts has been done, however, throughout the car and is unsatisfactory to the trade for the reason that mine cars are continually getting into wrecks and it is frequently necessary to take parts out of the car and straighten them, and then replace these straightened parts, and it is also necessary to replace parts of the car that have given way. A car that is electrically welded throughout would therefore be unsatisfactory unless the operator had an electric apparatus and expert welders in order to do the repair work at its plant.

It is the object of this invention to provide a car that is partly welded and partly riveted, so as to combine the advantages of electric welding with the advantage of easily repairing the car due to the riveting. In other words, the advantage of welding some of the parts of the car together is utilized and made practical and useful to the coal operator by combining with it the idea of connecting other associated parts by rivets which may be easily installed when replacing parts of the car.

This applies particularly to the main structure members of the car frame and car body, such as the joining together of the side and end wall structures and sills.

In the accompanying drawings:

Fig. 1 is a side elevation of a complete car embodying the invention;

Fig. 2 is an enlarged side elevation of an end portion of the car;

Fig. 3 is a top plan view of an end portion of the car;

Fig. 4 is an end elevation thereof; and

Fig. 5 is a detailed sectional view showing a modification in the joint.

The invention is shown as applied to a mine car of the usual construction, being usually termed a four-wheel mine car, the wheels of which are designated by the numeral 1 and are mounted on the usual axles 2, supporting the truck frame and body.

The truck frame has the side sills 3 joined together by the end sills 4 which carry the bumpers 5. Angle corner brackets 6 are used to connect the side sills 3 with the end sills 4 and, in the form shown in Figs. 1 to 4, these corner backets 6 are electrically welded to the side sills 3 and are secured to the end sills by means of rivets 7, or other similar fastenings, but rivets are ordinarily employed in mine car construction.

Mounted upon the truck frame is the car body which comprises the body side sills 8 and the body end sills 9, joined together in the usual way by angle corner brackets 10, which extend between the same and are welded to the side of the body side sills 8 but are secured to the body end sills 9 by rivets 11 or similar fastenings.

In the modification shown in Fig. 5, these corner brackets 10 are welded to the body end sills 9 and are riveted to the body side sills 8, as by the rivets 11', and a similar modification may be made in the connection of the side and end sills of the truck frame together.

In this way, welding is utilized as a means of connecting a portion of the frame structure to both the truck and body frames, or either of them together, while yet utilizing in cooperation therewith a riveting of such elements as are likely to need replacement or straightening. This is particularly true of the end sills and bumper structure which are connected with the side sills by the combined welding and riveting to attain these results.

The corner connections of the frame structure are welded to one member and riveted to the other, which gives the advantages of the welding and the advantages of the riveting. The corner angles are preferably riveted to the end members before the welding process, and may then be fitted to the longitudinal frame members and welded into place without regard to the fitting, as would be necessary if they were riveted at both points. This eliminates a great deal of fitting work in the assembling of the car.

While the invention has been described in connection with mine cars, as being particularly applicable thereto, yet it may be applied to a standard railroad car construction, if found desirable.

I claim:

1. In a railway car, the combination of main longitudinal members, main cross members adapted to be connected therewith, and connecting members for connecting the longitudinal and cross members together and having a riveted connection with one of said members, and a welded connection with the other.

2. In a railway car, the combination of longitudinal frame members, a cross frame member adapted to be connected with said longitudinal members and to be removable therefrom for replacement or the like, and a connecting member for securing said cross member to each of said longitudinal members, and having a riveted connection with one of said members and a welded connection with the other.

3. In a railway car, the combination of longitudinal frame members, end sills arranged between said longitudinal frame members and adapted to be connected therewith for removal for repair or replacement, a corner bracket for connecting said end sills with each of said longitudinal frame members, said bracket having a riveted connection with one of said members and a welded connection with the other.

4. In a mine car construction, the combination of side sills, end sills arranged therebetween, and corner brackets connecting the end sills with the side sills, each of said brackets having a riveted connection with one of the sills and a welded connection with the other.

5. In a mine car construction, the combination of side sills, end sills arranged therebetween and adapted for removal for replacement or repair, corner brackets for connecting the end sills with the side sills, each of said brackets having a riveted connection with the end sills and a welded connection with the side sills.

6. In a mine car construction, the combination of side sills, end sills arranged between the side sills and adapted for removal for replacement or repair, and corner brackets connecting the end sills with the side sills, each of said corner brackets having a riveted connection with the side sills and a welded connection with the end sills.

7. In a railway car construction, the combination of longitudinal and transverse members of the lading body side and end walls, and means connecting said longitudinal and transverse members together and having a riveted connection with at least one of said members and a welded connection with the other.

In testimony whereof I have signed my name, this 26th day of January, in the year one thousand nine hundred and thirty-one.

HUGH W. SANFORD.